United States Patent
Sorter et al.

(10) Patent No.: US 6,748,932 B1
(45) Date of Patent: Jun. 15, 2004

(54) FUEL REGULATOR FOR NATURAL GAS FIRED CO-GENERATION UNIT

(75) Inventors: Richard L. Sorter, Verdi, NV (US); Gerald H. Dorn, Reno, NV (US)

(73) Assignee: Chapeau, Inc., Granite Bay, CA (US)

( * ) Notice: Subject to any disclaimer, the term of this patent is extended or adjusted under 35 U.S.C. 154(b) by 0 days.

(21) Appl. No.: 10/361,538

(22) Filed: Feb. 10, 2003

(51) Int. Cl.[7] .......................... F02B 43/00; G05D 16/02
(52) U.S. Cl. ..................................... 123/527; 137/484.2
(58) Field of Search ................................ 123/525, 526, 123/527, 528, 529, DIG. 12, 463, 452, 453; 137/340, 375, 484.2, 484.4, 484.6, 484.8, 505.18, 505.36, 505.37

(56) References Cited

U.S. PATENT DOCUMENTS

| | | | |
|---|---|---|---|
| 3,580,232 A | | 5/1971 | Sarto ..................... 123/568.17 |
| 3,874,414 A | | 4/1975 | Dollison ................. 137/625.66 |
| 4,503,831 A | * | 3/1985 | Rijkeboer ................... 123/525 |
| 4,509,479 A | * | 4/1985 | Rijkeboer ................... 123/525 |
| 5,025,758 A | * | 6/1991 | Djurdjevic ................. 123/527 |
| 5,218,945 A | | 6/1993 | Kapellen et al. ............ 123/687 |
| 5,224,457 A | * | 7/1993 | Arsenault et al. ........... 123/526 |
| 5,285,810 A | * | 2/1994 | Gotthelf ..................... 137/340 |
| 5,370,097 A | * | 12/1994 | Davis ........................ 123/526 |
| 5,381,819 A | * | 1/1995 | Gotthelf ..................... 137/340 |
| 5,443,083 A | * | 8/1995 | Gotthelf ..................... 137/340 |
| 5,890,512 A | * | 4/1999 | Gotthelf et al. .......... 137/484.6 |
| 6,178,952 B1 | * | 1/2001 | Lammerts et al. .......... 123/527 |

FOREIGN PATENT DOCUMENTS

| | | |
|---|---|---|
| EP | 000522434 A1 * | 1/1993 |
| EP | 001087281 A1 * | 3/2001 |

* cited by examiner

Primary Examiner—Willis R. Wolfe
(74) Attorney, Agent, or Firm—Lee G. Myers, Esq.

(57) ABSTRACT

A natural gas fuel regulator for a natural gas fueled internal combustion engine for driving a co-generation plant, which allows exhaust recycled gas combustion while maintaining lower head temperatures to reduce thermal $NO_x$ emissions. The gas regulator has a modulation chamber, which modulates incremental pressure changes from the carburetion system to allow the engine to respond to load changes without the necessity for dynamic control feed back valve. In one aspect, a non-diaphragm venturi fuel/air-mixing unit with post turbo charger throttle adjustment is downstream of the natural gas fuel regulator to provide lean burn, low thermal $NO_x$ operation of the co-generation unit from no load to full load electrical generation.

20 Claims, 5 Drawing Sheets

FUEL REGULATOR FOR NATURAL GAS FIRED CO-GENERATION UNIT

BACKGROUND OF THE INVENTION

1. Field of the Invention

The present invention relates generally to fuel regulators for engines in co-generation units; and, more particularly, natural gas regulators for internal combustion engine driven co-generation units.

2. Description of Related Art

Electric energy generation in this country has lagged behind demand. There are a number of reasons for this, but chief among them is failure of traditional energy producers to replace spent units and capitalize new plants. This has been, in part, due to increased air quality regulations. In addition, new challenges face electric generation-security. Events of Sep. 11, 2001 showed this nation its vulnerability to terrorist attack. Vital operations, such as police, medical and civil defense that relied upon the electric power "grid" for service, realized that their needs were susceptible to disruption and viewed stand-alone units as well as micro grids as a possible solution. These alternatives are fraught with their own problems. Chief among the reasons is a drastic increase in demand. Thus, while energy demand has increased, generating capabilities have not.

One reason for the growth in demand is the increased use of computers and other technology for industrial and business purposes, as well as personal use. As computer usage continues to grow, the use of power-consuming peripheral technologies, such as printers, cameras, copiers, photo processors, servers, and the like, keep pace and even expand. As business use of computer based equipment continues to rise, as do the number of in-house data servers, outsourced data storage facilities, financial systems, and Internet-related companies requiring constant electrical uptime and somewhat reducing traditional peak demand times, requirement for reliable, cheap, environmentally compliant electrical power, continues to grow.

Other technological advances have also increased electrical energy demand. Increased use of power consuming devices in every aspect of life from medical to industrial manufacturing robots, as well as innovations in almost every research and industrial field, are supported by increasingly complex technology, which requires more electrical power to function. CAT scans, NMRs, side looking X-rays, MRIs and the like, all take electrical power.

As a result, the Federal Government deregulated power generation, and a number of states have begun to establish competitive retail energy markets. Unfortunately, the deregulation process has not provided adequate incentives for industry entities to construct generating facilities, upgrade the transmission grid, or provide consumers with price signals to enable intelligent demand-side management of energy consumption. With the deregulation in the utility market, energy (kWh) has become a commodity item that can be bought or sold. However, swings in supply and demand leave end users open to fluctuations in the cost of electricity.

According to the ETA, to meet projected increases in demand over the next 20 years, at least 393 GW of additional generating capacity must be added. In some areas, the growth in demand is much higher than the projected two percent average (e.g., California's peak electricity demand grew by 18 percent between 1993 and 1999, while generating capacity increased by only 0.3 percent.) Despite California's highly publicized energy situation, a similar problem exits for other states as well; the New York Independent System Operator recently stated that 8600 MW of additional generating capacity (a 25 percent increase) must be added by 2005 to avoid widespread shortages that may lead to blackouts.

In addition to the mismatch between demand and generating capacity, the physical transmission infrastructure necessary to deliver power from geographically remote generating facilities to the consumer's location is unable to support the increased load. Even under today's operating conditions, the transmission grid is subject to stress and occasional failure.

Further, security and reliability of source has become of increasing concern. Grid system vulnerability and blackouts have become more commonplace. Strategic industries are looking to cut energy costs, increase reliability, and assure security. This has lead to an interest in distributed market technologies. The potential market for distributed generation has become vast without adequate means for fulfilling this need. Again, inefficiency, reliability, and environmental concerns are major barriers. The compelling economics are made on engine efficiency without the financial benefit of waste heat usage, yet with all of the same customer reluctance to accept hassles. Industry estimates indicate that the existing market for distributed generation is $300 billion in the United States and $800 billion worldwide.

The need to leverage existing technology while transitioning to alternative energy sources is an important consideration for meeting this challenge. Although most existing distributed generation sites use small gas turbine or reciprocating engines for generation, there are many alternatives that are being considered over the longer term. Technologies, such as micro turbines, are currently available, but only used at a relatively small number of sites. These newer generators offer some inherent advantages, including built-in communications capabilities. It is anticipated that fuel cells will be available in the next five years, which will provide some highly appealing, environmentally friendly options.

As it stands today however, small gas turbine and reciprocating engines comprise a substantial proportion of existing generator technology in the market and will for some time to come for a number of reasons. Engines provide the best conversion efficiency (40%), and they can operate using non-pressurized gas. Micro turbines, on the other hand, require compressed gas and conversion efficiency is lower (approximately 30%). These latter generators tend to be used in wastewater and landfill and other specialty sites, where a conventional prime mover is unable to stand up to poor fuel quality. Therefore, for utilities to truly benefit from a distributed generation scheme over the short term, they must look to the existing generator technology to provide a sustainable and affordable solution.

Waste heat utilization or co-generation is one way to meet this challenge. In the case of power generation, the waste heat is not used, and the economics are based largely on the cost of the electricity produced (i.e. heat rate is paramount), with little consideration for improved reliability or independence from the electric grid. The anticipated fluctuation in energy costs, reduced reliability, and increasing demand has led end users to consider maximizing efficiency through use of heat from generation of on-site generating-heat capture systems, i.e. co-generation, or "Combined Heating and Power" (CHP).

Co-generation of electricity and client service heat to provide space heating and/or hot water from the same unit is one solution. Cogeneration provides both electricity and usable process or utility heat from the formerly wasted energy inherent in the electricity generating process. With cogeneration, two problems are solved for the price of one. In either case, the electricity generation must meet stringent local air quality standards, which are typically much tougher than EPA (nation wide) standards.

On-site co-generation represents a potentially valuable resource for utilities by way of distributed generation. A utility can increase capacity by turning to a "host" site (e.g. industrial user) with an existing generator, and allow them to parallel with the grid and use their generator capacity to handle peak volumes. From the utility's point of view, the key advantages to a distributed generation solution are twofold: improved system reliability and quality; and the ability to defer capital costs for a new transformer station.

For customers who can use the process/utility waste heat, the economics of cogeneration are compelling. The impediment to widespread use is reliability, convenience, and trouble free operation. Cogeneration products empower industrial and commercial entities to provide their own energy supply, thus meeting their demand requirements without relying on an increasingly inadequate public supply and infrastructure.

Unfortunately, to date, the most widespread and cost-effective technologies for producing electricity require burning hydrocarbon-based fuel. Other generating technologies are in use, including nuclear and hydroelectric energy, as well as alternative technologies such as solar, wind, and geothermal energy. However, burning fuel remains the primary method of producing electricity. Unfortunately, the emissions associated with burning hydrocarbon fuels are generally considered damaging to the environment, and the Environmental Protection Agency has consistently tightened emissions standards for new power plants. Green house gases, as well as entrained and other combustion product pollutants, are environmental challenges faced by hydrocarbon-based units.

Of the fossil fuels, natural gas is the least environmentally harmful. Most natural gas is primarily composed of methane and combinations of Carbon Dioxide, Nitrogen, Ethane, Propane, Iso-Butane, N-Butane, Iso Pentane, N-Pentane, and Hexanes Plus. Natural gas has an extremely high octane number, approximately 130, thus allowing higher compression ratios and broad flammability limits. A problem with using natural gas is reduced power output when compared to gasoline, due mostly to the loss in volumetric efficiency with gaseous fuels. Another problem area is the emissions produced by these natural gas engines. Although, the emissions are potentially less than that of gasoline engines, these engines generally require some types of emissions controls such as exhaust gas reticulation (EGR), positive crankcase ventilation (PCV), and/or unique three-way catalyst.

Still another problem with using natural gas is the slow flame speed, which requires that the fuel be ignited substantially before top dead center (BTDC). In general, most internal combustion engines running on gasoline operate with a spark advance of approximately 35 degrees BTDC where as the same engine operating on natural gas will require an approximate advance of 50 degrees BTDC. The slower burn rate of the fuel results in reduced thermal efficiency and poor burns characteristics.

It is well known that emission reduction for natural gas engines can be accomplished by recycling of exhaust gases to make the engines run lean. Numerous systems have been devised to recycle exhaust gas into the fuel-air induction system of an internal combustion engine for the purposes of pre-heating the air-fuel mixture to facilitate its complete combustion in the combustion zone, for re-using the unignited or partially burned portions of the fuel, which would otherwise pass to exhaust and into the atmosphere, and for reducing the oxides of nitrogen emitted from the exhaust system into the atmosphere. It has been found that approximately 15 to 20 percent of exhaust gas recycling is required at moderate engine loads to substantially reduce the nitrogen oxide content of the exhaust gases discharged in the atmosphere, that is, to below about 1,000 parts per million.

Although the prior art systems have had the desired effect of reducing nitrogen oxides in the exhaust by reducing the maximum combustion temperature as a consequence of diluting the fuel-air mixture with recycled exhaust gases during certain operating conditions of the engine, these systems have not been commercially acceptable from the standpoints of both cost and operating efficiency and have been complicated by the accumulation of gummy deposits which tend to clog the restricted bypass conduit provided for recycling the exhaust, and have also been complicated by the desirability of reducing the recycling during conditions of both engine idling when nitrogen oxide emission is a minor problem and wide open throttle when maximum power is required, while progressively increasing the recycling of exhaust gases with increasing engine load.

In the usual hydrocarbon fuel type engine, fuel combustion can take place at about 1,200° F. The formation of nitrogen oxides does not become particularly objectionable until the combustion temperature exceeds about 2,200° F., but the usual engine combustion temperature, which increases with engine load or the rate of acceleration at any given speed frequently, rises to about 2,500° F. It is known that the recycling of at least one-twentieth and not more than one-fourth of the total exhaust gases through the engine, depending on the load or power demand, will reduce the combustion temperature to less than 2,200° F. Contaminants in the exhaust resulting from fuel additives desired for improved combustion characteristics normally exit in a gaseous state at combustion temperatures exceeding about 1,700° F., but tend to condense and leave a gummy residue that is particularly objectionable at the location of metering orifices and valve seats in the exhaust recycling or bypass conduit. The thermal nitrogen oxide emission is a direct function of combustion temperature and for that reason is less critical during engine idling when the rate of fuel combustion and the consequent combustion temperature are minimal but tends to be problematic during throttle up and extended full speed operation.

Thus, prior art co-generation systems employing internal combustion engines, and specifically, natural gas fueled engines have suffered from the myriad of problems including elevated head temperatures and inability to deliver large quantities of process and/or utility heat to the co-generation client. Excessive head temperatures lead to inefficient operation and unacceptable environmental conditions, which include excessive use of fuel, as well as significant $NO_x$ production.

Some of the inherent problems with natural gas fueled engines, which utilize exhaust gas recycle techniques to reduce pollution, are a result of carburetion problems, which prevent them from running lean. Specifically, the natural gas regulators have been unable to supply natural gas to the engine throughout the load cycle while maintaining a fuel to air ratio, which does not starve the engine or alternatively run it to rich. In the former case the engine stalls in the later, fuel efficiency and $NO_x$ production become out of limits.

Prior art internal combustion engines operating on natural gas and used as power units to spin electric generators use various types of fuel carburetion, regulation, and introduction systems. One device for carburetion uses a diaphragm, which opens under engine vacuum, to operate a fuel-metering valve, allowing fuel to enter an air-mixing chamber where it is mixed with air for combustion. The diaphragm regulates fuel flow by responding to the changes in vacuum pulled by the engine. These systems have inherent drawbacks. For one, the diaphragm must be several times the size of the gas inlet. For example, a three-inch diameter inlet could require a diaphragm of 15–18 square inches. For a second, when recycled exhaust gas is used the recycle gas tends to erode the diaphragm. Finally, these systems are prone to diaphragm rupture from engine backfire through the intake system. The mixture of fuel/air/recycle gas from the mixing chamber then passes through a throttle regulator, which regulates the flow of the mixture to the engine as a function of load. In some configurations an exhaust gas driven turbocharger is used to pre-compresses the mixture prior to injection into the cylinder. The use of a turbocharger increases the vacuum on the carburetion unit.

If the engine is turbocharged, the air/recycle gas/fuel mixture passes through the turbocharger, and then preferably through an engine intercooler to cool the compressed air/recycle gas/fuel mixture and into the engine cylinders. The combination of a large diaphragm section, mixing section, and throttle section in the carburetion unit make for a large and bulky apparatus, which must be mounted directly on the engine intake.

Therefore, a more fuel-efficient balanced venturi style fuel/air mixing unit was developed. This style of fuel introduction is now utilized on most natural gas fired internal combustion engines because it is easy to obtain parts, assemble, and mount to the engine. One drawback is that a separate gas shut-off valve must be installed upstream of the venturi for engine shutdown. Another is flooding from pressurized fuel sources. Finally, the load variations on these systems make fuel regulation upstream of the venturi compelling.

Engines, which utilize this venturi fuel carburetion system, utilize a series of small ports of a size determined by the fuel requirement. Air is drawn into a chamber surrounding the venturi by vacuum. If the fuel is under a positive pressure, the chamber floods prior to ignition, which prevents ignition of the engine. Thus, a regulator is required upstream of the venturi. One type of regulator employs one or more diaphragms, which respond to variation in engine or burner vacuum. For most applications, these vacuum operated devises work reasonably well because, like a burner, the requirement for fuel is full on or full off.

However, when engines such as turbocharged natural gas fueled internal combustion engines are employed, regulators must respond to a myriad of incremental changes in RPM of the engine to fulfill electrical generation load requirements of the electrical system. Because this requires carburetion of the fuel over a fairly broad range of intake settings, some gas regulation devises have employed dynamic feed back control gas regulator devises that work upon incremental movement of an electrically actuated valve. Such devises, while effective, require complicated control circuitry, as well as transducers, to modulate current-flow to the electric valve. Unless these valves are substantially analog, the carburetion of the engine is not smooth, leading to inefficiencies, especially with co-generation units. When exhaust gas recycle is employed in the intake gas to reduce thermal $NO_x$, the regulation of the natural gas fuel stream becomes even more critical. This is especially true with so called "lean burn" operations.

Therefore, it would be advantageous to have a simple fuel regulator device, which operates solely on engine intake gas manifold pressure, including pressures upstream of a turbocharger, to incrementally regulate fuel flow to the carburetion unit throughout the operating range of the engine. In this manner, no external circuitry would be required to regulate the gas flow of the device, yet, the response could be sensitive enough to maintain the turbocharged fuel/air/recycled exhaust gas to the engine over a range from idle to full throttle, with little deviation of proportion of the mixture. In this manner "lean burn" engines could operate in this configuration substantially through the entire operating range of the engine. It would be further advantageous to employ the metering accuracy of a spring-tensioned diaphragm without the deterioration or the large inlet port to diaphragm size ratio.

SUMMARY OF THE INVENTION

A natural gas regulator for a natural gas fueled internal combustion engine co-generation plant, which allows efficient, "lean burn" operation of the engine from no load to full load generation without the requirement of adjusting fuel restricting valves has now been discovered. The gas regulator of the instant invention employs a pressure modulation chamber, which dampens incremental pressure changes from the engine carburetion system and allows a fuel flow-regulating valve to respond uniformly throughout the acceleration range of the engine. In one aspect, a non-diaphragm venturi fuel/exhaust gas/air-mixing unit, with post turbocharger throttle adjustment, is downstream of the natural gas fuel intake regulator to provide lean burn operation of the co-generation unit, through exhaust gas recycle to maintain lower head temperatures thereby reducing thermal $NO_x$ emissions.

In one embodiment, the pressurized inlet natural gas source passes through a small micron fuel gas filter into a housing with an electric solenoid to maintain a fuel shut-off valve in an open position. Two metering valves, one with diaphragm for sensing small vacuum changes delivered to the chamber by load variations of the engine to induce a second manual trim valve set to a single position to moderate fuel flow to the air/exhaust gas/fuel venturi. A pressure modulating chamber mounted between the diaphragm chamber and a manual trim valve chamber provides pressure modulation of the pressure generated by the engine carburetion system to stabilize engine performance throughout the performance range of the engine and particularly to variation in load.

BRIEF DESCRIPTION OF THE DRAWINGS

The following drawings form part of the present specification and are included to further demonstrate certain embodiments. These embodiments may be better understood by reference to one or more of these drawings in combination with the detailed description of specific embodiments presented herein.

DETAILED DESCRIPTION OF THE PREFERRED EMBODIMENTS

A fuel regulator for natural gas fired co-generation unit regulates natural gas, under pressure, from a remote fuel source, such as a tank, to an engine carburetor where the fuel is mixed with air for intake into the cylinders of an internal combustion engine. In accordance with one aspect of the invention, recycle exhaust gas is admixed with the air and fuel to reduce $NO_x$ emissions from the engine as will be further explained below. In accordance with a further aspect, the engine is supercharged by, for example, an exhaust gas driven turbocharger, to enhance engine performance. When the engine is turbocharged using recycle exhaust gas, the exhaust gas is mixed with combustion air upstream of the carburetor, then admixed with fuel by, for example, fuel aspiration. The turbocharger places an extra vacuum load on the engine side of the carburetor. Advantageously, the turbocharged mixture of hot exhaust gas, fuel, and air is cooled prior to entrance into the engine cylinder to reduce head tempeture, and thus, $NO_x$ emissions from the engine.

The fuel regulator can comprise one or more sections or elements to regulate flow of the pressurized fuel into the carburetor. In accordance with the invention, a first gas metering chamber is provided to meter the flow of gas dynamically in response to the requirements of the engine by means of incremental changes in vacuum pressure from the carburetion device. A second gas flow-restricting chamber, downstream of the metering chamber, but in gas communication therewith, is provided to restrict the flow of gas by means of a manual set valve, which is used to "tune" the engine and is manually set and maintained. An upper diaphragm responds to incremental vacuum changes from load variation and induces the lower diaphragm to modulate fuel flow to the venturi to maintain engine RPM during load changes.

Placed between the first gas metering chamber and the second gas flow-restricting chamber is a modulating chamber in gas communication with both the gas metering chamber and the second preset gas flow-restricting chamber. As will be further described below, the modulating chamber acts to modulate the pressure of intake gas and the vacuum pressure from the carburetor to provide a smooth transition from intake to outlet of the gas, as it is metered by the preset gas-metering chamber in response to engine demands as communicated to the regulator by varying vacuum pressure from the carburetor.

Advantageously, the metering chamber contains at least one spring-tensioned diaphragm, which opens under engine vacuum to operate a fuel-metering valve allowing fuel to enter a gas-metering chamber. The metering chamber contains a pressure balance line to ambient pressure, which allows the substantially instantaneous deformation of the diaphragm in response to incremental changes in pressure within the chamber. Changes in engine vacuum increasing or decreasing from engine load changes impart very small vacuum changes that cause the metering chamber diaphragm to open and close the fuel inlet valve to allow appropriate fuel flow through the regulator to pass to the carburetor through the preset gas regulating chamber.

Figure 1:
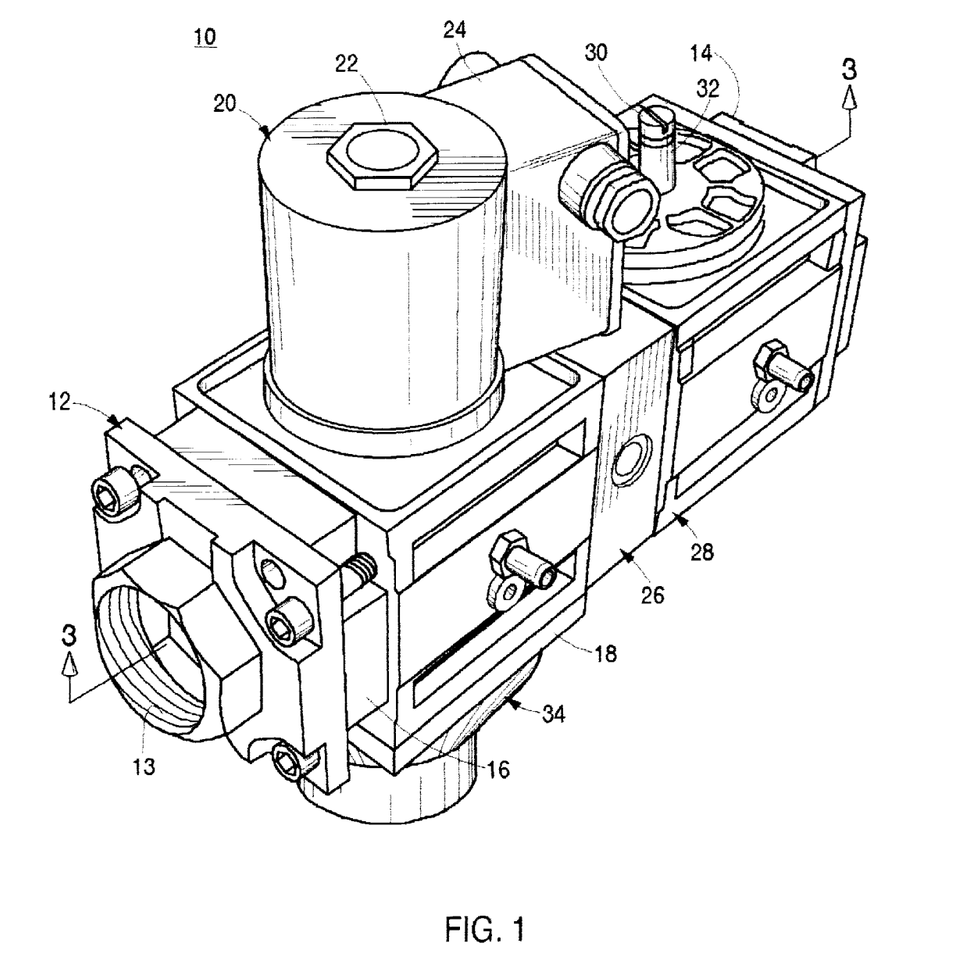
FIG. 1 is a perspective view of the fuel regulator of the instant invention.

There is shown in FIG. 1 an illustrative view of the fuel regulator device 10 in accordance with the instant invention. The fuel regulator device 10 comprises an inlet-coupling element 12 and outlet-coupling element 14 as better seen in FIG. 2. Inlet-coupling element 12 has a threaded nipple 13 adopted to receive a 1.5" fuel line, which nominally operates at from about 1.5 to 2.0 PSIG. Fuel from a pressurized source (not shown) communicates with the inlet-coupling element 12. A micron mesh fuel filter 16 connects inlet-coupling element 12 to gas metering/shutoff component 18. The filter prevents entrained contaminants from entering the system through the fuel source. Gas metering/shut off component 18 carries a solenoid housing 20, which contains a standard electrically operated solenoid (not shown.) Solenoid housing 20 is held in place on gas metering/shut off component 18 by retaining nut 22. By means of electrical connection 24, a standard electrical solenoid operates a solenoid actuation rod 36 as seen in FIGS. 3 and 4.

The solenoid is a "dead-man" shutdown switch. As better seen in FIG. 4, when the solenoid is de-energized, the fuel regulating valve 40 is closed, and gas is precluded from flowing through the regulator, as will be further explained with respect to FIG. 3. A modulating element 26 contains a pressure-modulating chamber 66 and sealably abuts gas metering/shut off component 18 and the manual fuel trim valve assembly housing 28. Valve adjustment setting screw 30, which threadably engages threaded sleeve 32 on the exterior of manual fuel trim valve assembly housing 28 is manually set to "tune" the engine by means of a fuel-regulating valve 72 as will be further described below. Outlet-coupling element 14 sealably abuts manual fuel trim valve assembly housing 28 and carries threaded nipple 82 for connection to carburetor fuel line as is better seen in FIG. 5.

Figure 2:
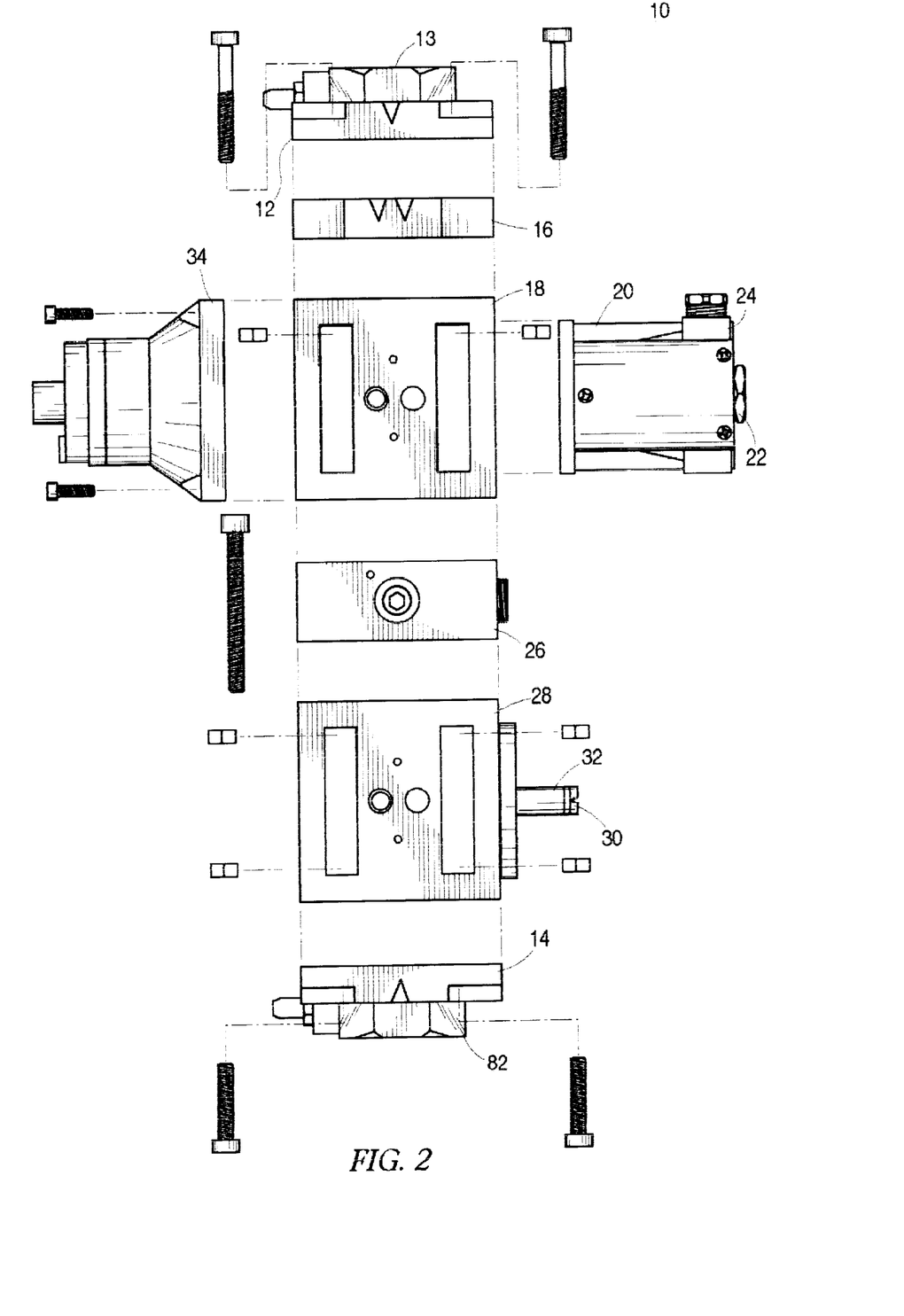
FIG. 2 is a an exploded view of the flow chart of the engine cooling loop of the fuel regulator of the instant invention.

As better seen in FIG. 2, which is a side looking exploded view of FIG. 1, where like elements contain like numbers, there is shown the individual elements of fuel regulator device 10 as assembled. Micron mesh fuel filter 16 is advantageously used to provide clean fuel to the system but is not required. As seen in FIG. 2, each component is bolted together, thus providing ease of exchange components, as well as cleaning and maintenance.

Figure 3:
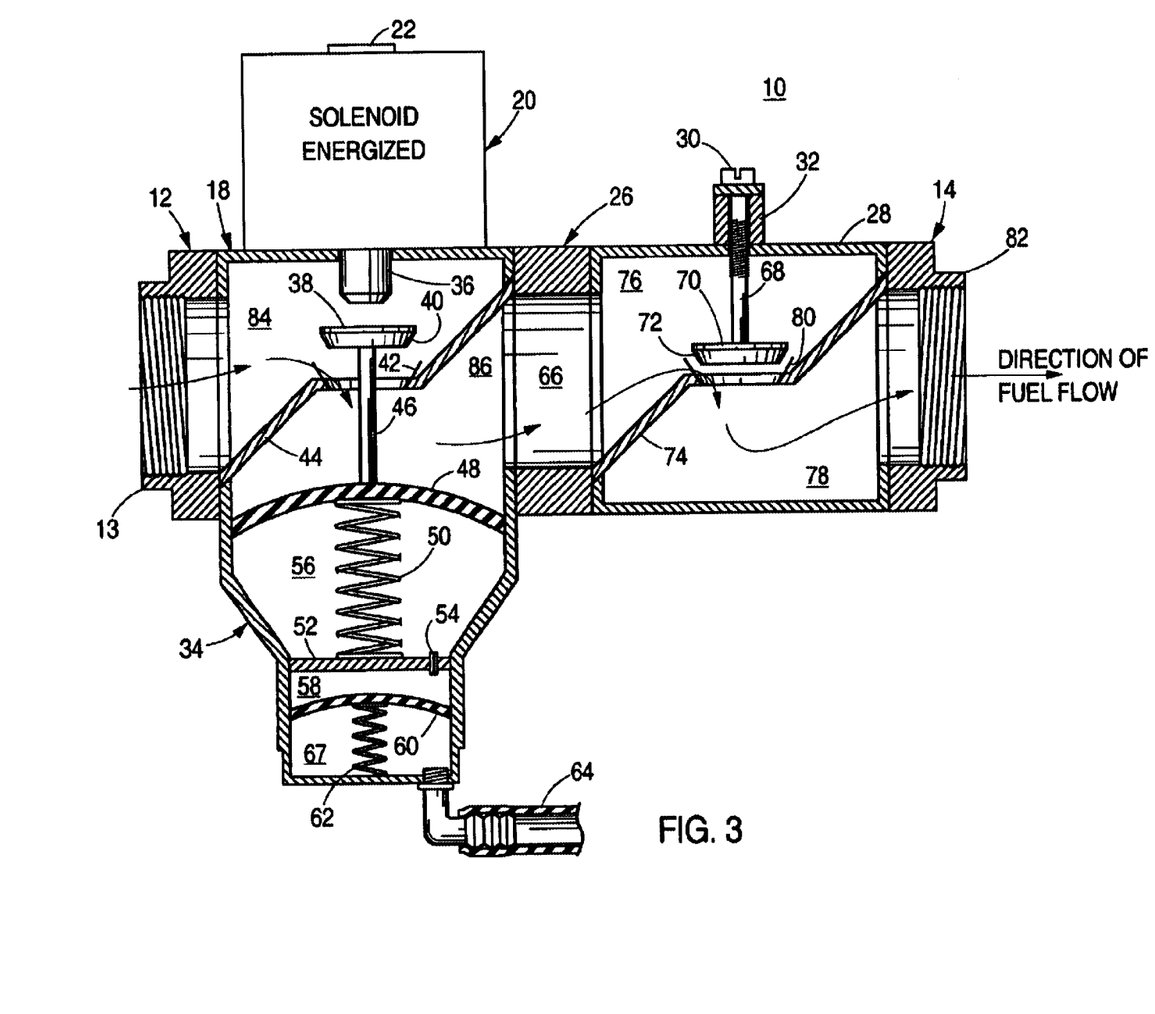
FIG. 3 is a cut away along lines 3—3 of FIG. 1.
Figure 4:
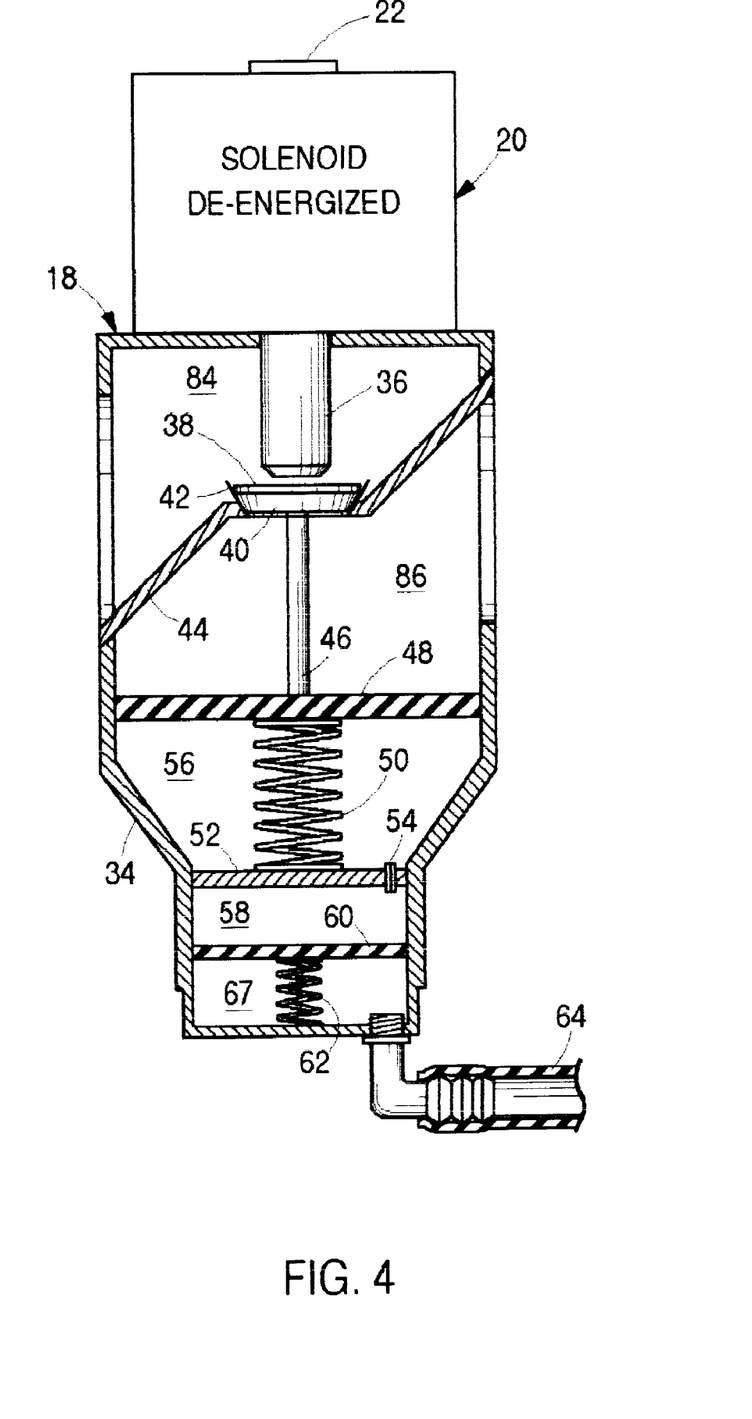
FIG. 4 is a cut away of the fuel regulating chamber in accordance with the instant invention with the solenoid deactivated; and, FIG. 5 is a flow chart detail of an example integration of the fuel regulator of the instant invention with a turbocharger intercooler radiator loop interface, the engine intake gas system and the engine exhaust system including the exhaust recycle.

Turning to FIG. 3, there is shown a cutaway of FIG. 1 along line 3—3. FIG. 3 shows the internal workings of the fuel regulator device 10 when the solenoid is activated. FIG. 3 does not show the optional micron mesh fuel filter 16. Inlet-coupling element 12 carries threaded nipple 13 and communicates with gas metering/shutoff component 18, as shown. Gas metering/shutoff component 18 has mounted thereon a solenoid housing 20, which contains a solenoid (not shown) to actuate solenoid actuation rod 36, and a diaphragm housing 34, containing the gas regulating membranes as will be further described.

Solenoid actuation rod 36, the end of which contacts metal contact plate 38, which in turn is seated upon fuel regulating valve 40. Fuel regulating valve 40 sealably engages valve seat 42, when the solenoid housing 20 is de-energized, as shown in FIG. 4. In this configuration, all gas flow is shut-off through fuel regulator device 10. Within gas metering/shutoff component 18 is a solid partition 44, which divides gas metering/shutoff component 18 into an upper gas receiving chamber 84 and a lower gas receiving chamber 86 and contains valve seat 42 therein, such that when fuel regulating valve 40 is fully seated in valve seat 42, gas flow is shut off. In operation, with the solenoid energized, as shown in FIG. 3, the solenoid actuation rod 36 is retracted allowing fuel regulating valve 40 to open and close by means of valve stem 46.

Valve stem 46 communicates with, and is advantageously attached to the bottom portion of, fuel regulating valve 40 on one end and upper diaphragm 48 on the other. The upper diaphragm assembly includes upper diaphragm 48, which is sealably housed in diaphragm housing 34 and an upper diaphragm seating spring 50, which engages the underside of upper diaphragm 48 and rests on platform 52. Platform 52 is sealably supported by the sidewalls of diaphragm housing 34. The underside of upper diaphragm 48 and platform 52 in cooperation with the sidewalls of diaphragm housing 34 forms an upper diaphragm chamber 56.

A lower diaphragm assembly resides in the diaphragm housing 34, beneath the upper diaphragm assembly. The lower diaphragm assembly, includes lower diaphragm 60, which is sealably housed in diaphragm housing 34, and a lower diaphragm seating spring 62, which engages the underside of lower diaphragm 60 and rests on the bottom closure of diaphragm housing 34 to form a sealed unit. The upper side of lower diaphragm 60 and the lower side of platform 52 in cooperation with the sidewalls of diaphragm housing 34 form a first lower diaphragm chamber 58. The underside of lower diaphragm 60 and the bottom closure of diaphragm housing 34 in cooperation with the sidewalls of diaphragm housing 34 form a second lower diaphragm chamber 67.

Platform 52 has a pressure equalization port 54, which communicates between the upper diaphragm chamber 56 and first lower diaphragm chamber 58. A pressure equalization tube 64 communicates with second lower diaphragm chamber 67 and ambient. These two devices equalize the pressure between the chambers as the diaphragms deform in operation.

Modulating element 26 sealably attaches to gas metering/shutoff component 18 such that pressure-modulating chamber 66 communicates with lower gas receiving chamber, interior of gas metering/shutoff component 18 and modulating element 26 sealably attaches to manual fuel trim valve assembly housing 28 such that pressure-modulating chamber 66 communicates with the upper gas receiving chamber 76 interior of manual fuel trim valve assembly housing 28.

Manual fuel trim valve assembly housing 28 contains a valve steam 68, which is capped by valve adjustment settings screw 30 and threadably engages treaded sleeve 32. The lower end of valve steam 68 is attached to metal valve plate 70 seated on fuel regulating valve 72. Within manual fuel trim valve assembly housing 28 is a solid separating membrane 74, which divides the manual fuel trim valve assembly housing 28 into an upper gas receiving chamber 76 and a lower gas exiting chamber 78 and contains valve seat 80 therein, such that when fuel regulating valve 72 is fully seated in valve seat 42, gas flow is shut off. Outlet-coupling element 14 carries threaded nipple 82 for connection to a carburetor fuel line 92 as seen in FIG. 5.

In operation, the solenoid, which is de-energized so that solenoid actuation rod 36 is in the fully extended position, closes fuel-regulating valve 40, as shown in FIG. 4. Upon ignition of the engine, the solenoid is energized and solenoid actuation rod 36 is fully retracted, allowing modulated opening and closing of fuel regulating valve 40 in response to movement of upper diaphragm 48. Fuel entering, under pressure, through inlet-coupling element 12, passes into upper gas receiving chamber 84 of gas metering/shutoff component 18, through valve seat 42 into lower gas receiving chamber 86, through pressure-modulating chamber 66, into upper gas receiving chamber 76 in manual fuel trim valve assembly housing 28, through valve seat 72, into lower gas exiting chamber 78 and exits outlet-coupling element 14 to fuel line 92. The valve seat 72 is manually set by means of threadably adjusting valve adjustment settings screw 30 to regulate the maximum gas flow rate through the manual fuel trim valve assembly housing 28.

Figure 5:
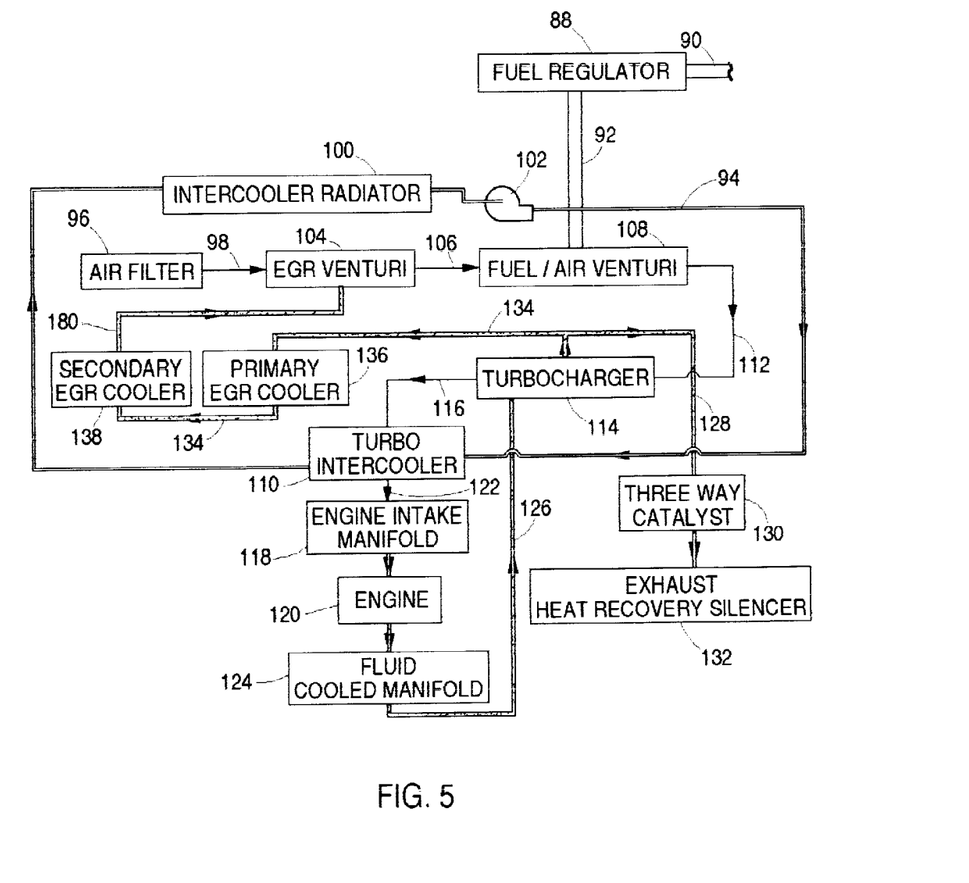

To better understand the invention in operation, FIG. 5 shows the interfaces between the turbo intercooler cooling circuit, the turbocharger, the engine intake manifold, and the recycled exhaust gas system. This interaction is important in that head temperatures, gas inlet temperatures, and exhaust gas recycle temperatures can be tuned. Ambient outside air passes through air filter 96 and intake conduit 98 to EGR venturi 104, where air is mixed with recycled exhaust gas from conduit 180, as will be more fully described. Mixed air and exhaust gas exits EGR venturi 104 through intake conduit 106 into fuel/air venturi 108 where the air/exhaust gas mixture entrains fuel from fuel regulator device 10. Fuel regulator device 10 is connected to a fuel source (not shown) by means of conduit 90. Fuel regulator device 10 communicates with fuel/air venturi 108 by means of fuel line 92. The fuel/air/exhaust gas mixture exits fuel/air venturi 108 via turbocharger intake conduit 112 and is compressed in turbocharger 114. The turbocharger, which is operated by engine exhaust, creates a vacuum on turbocharger intake conduit 112 which is translated back through the system to operate the fuel regulator as will be further described.

The compressed fuel/air/recycled exhaust gas mixture exits turbocharger 114 through turbo intercooler intake conduit 116 into turbo intercooler 110 where it is cooled from 400° F. to 165° F. Intercooler radiator 100, pump 102, and coolant circulating conduit 94 continually circulate coolant, in a closed loop, through turbo intercooler 110 to cool the compressed fuel/air/recycled exhaust gas mixture. The cooled intake gas exits turbo intercooler 110 into engine intake manifold 118 via engine intake conduit 122 and through intake manifold 118 into engine cylinders 120.

Exhaust gas from engine cylinders 120 exits into fluid cooled manifold 124 and enters turbocharger 114 through exhaust conduit 126 to power the turbocharger 114, thus compressing the fuel/air/recycled exhaust gas mixture entering turbocharger 114 by means of turbo intercooler intake conduit 116, as previously described. As can be seen, exhaust gas exiting turbocharger 114 is split into a recycled stream and an exhaust stream. The exhaust stream 128 enters three-way catalyst 130 and then exhaust heat recovery silencer 132. It will be realized by one skilled in the art that the exhaust heat recovery silencer 132 is on the co-generation process/utility heat system and provides additional heat recovery for that system. A portion of the exhaust gas to be recycled passes through conduit 134 to primary air cooled EGR cooler 136; and, if necessary, secondary air cooled EGR cooler 138 by means of conduit 134 and then passes into EGR venturi 104 through conduit 180.

The pressurization of the air/exhaust gas/fuel mixture by turbocharger 114 creates a vacuum upstream, as previously described. As fuel is pulled through fuel/air venturi 108, it creates a vacuum, which is transferred through fuel line 92 to fuel regulator device 10. The vacuum reduces pressure in lower gas exiting chamber 78 and upper gas receiving chamber 76 through pressure-modulating chamber 66 and in lower gas receiving chamber 86. The reduced pressure in lower gas receiving chamber 86 causes upper diaphragm 48 to deform, as shown in FIG. 3, moving valve stem 46 upwardly to open fuel regulating valve 40, as shown. Likewise, the reduction in pressure of upper diaphragm chamber 56 causes a corresponding reduced pressure to equalize through pressure equalization port 54 to create a vacuum in lower diaphragm chamber 58 causing lower diaphragm 60 to deform. Pressure equalization tube 64 allows equalization pressure into second lower diaphragm chamber 67 below lower diaphragm 60. Thus, as the vacuum pressure pulled on the fuel in fuel supply conduit 90 fluctuate upper diaphragm seating spring 50 and lower diaphragm seating spring 62 cooperate to attempt to reduce the deformity of upper diaphragm 48 and lower diaphragm 60, respectively, re-seating fuel regulating valve 40 in valve seat 42.

Advantageously, two diaphragms are used as shown in FIG. 3. This arrangement prevents a harmonic or "fluttering" of the first diaphragm as a vacuum serge is experiences by the fuel regulator device. However, it will be realized by one skilled in the art that a single diaphragm apparatus would be operative in accordance with the instant invention.

Thus, in accordance with the invention, fuel under pressure is introduced into the upper gas-receiving chamber 84. Fuel regulating valve 40 is modulated by movement of upper diaphragm 48 in response to vacuum applied to the system by varied throttling of the engine. The fuel-regulating valve 72 is manually set to maintain as lean a burn condition as permissible at full load as well as at engine starting to preclude a "too rich" setting causing miss-firing of the sparkplugs and/or damage to the three-way catalyst during engine warm-up. During operation, as the generator experiences a change in load with corresponding changes in engine throttle position, the corresponding increase or decrease in vacuum pressure causes the fuel modulating diaphragm to deform or return to its non-deformed position due to the action of the seating spring. These changes in vacuum cause the diaphragm to slightly "over compensate" for the fuel required for that load change. Rapid, or large load changes with corresponding pressure changes on the fuel-modulating diaphragm cause engine instability.

The pressure modulation chamber, in accordance with the instant invention, unexpectedly modulates the rapid pressure changes reducing the wide variations in the deformation of the fuel modulating diaphragm, which dampens the amplitude of the fuel regulating valve yielding less "overcompensation" to produce smoother engine operation over the full range of load conditions. Thus, rather than dynamically manipulating the valve adjustment settings screw by means of a control system, the modulating chamber allows the system to adjust to surges stabilizing engine operation throughout the full load range. The volume of the chamber and the spacing between the valves caused by inserting the chamber depends upon the system. Modulating element having a thickness (height) in the range of ¾ to 1.5" are useful in accordance with the system described. Diameters of from about 1.5 to 2.0 inches at the above referenced thickness are found to provide the required volume.

Thus, in accordance with the invention, ambient air (70° F.) flows through air filter to EGR venturi where it is mixed with up to 20% cooled exhaust gas (140° F.) at 100% load. The percent of recycled exhaust gas utilized is a function of engine load. This mixture (120° F.) then passes through the fuel/air venturi where fuel is drawn from the gas regulator and mixed with the ambient air and exhaust gas to be flowed to the intake side of the turbocharger. The fuel/air/recycle exhaust gas mixture is then pressurized by an exhaust gas-powered turbine to a pressure of 15 PSIG of at a temperature of 400° F. This pressurized mixture passes through the turbocharger intercooler, which reduces the pressurized, high temperature mixture to about 165° F. to be introduced into the intake manifold and then to the engine cylinders.

Following combustion, exhaust gas from the cylinders (1100° F.) passes through the coolant-cooled manifolds (not shown) to recover heat, which reduces the exhaust gas tempeture to about 940° F. The exit exhaust gas enters the exhaust (turbine driving section) of the turbocharger and, upon exiting, passes through a "T" with about 80% of the gas being flowed through a catalyst and a heat recovery silencer or muffler as previously described, and exhausted to atmosphere. A second portion comprising about 20% of the exhaust gas is passed through air coolers, as previously described, to the EGR venturi for introduction to the air/fuel intake system. The recycled exhaust gas is cooled by the air coolers to about 110° F. prior to admixing with air in the EGR venturi.

The foregoing discussions, and examples, describe only specific embodiments of the present invention. It should be understood that a number of changes might be made, without departing from its essence. In this regard, it is intended that such changes—to the extent that they achieve substantially the same result, in substantially the same way—would still fall within the scope and spirit of the present invention.

What is claimed is:

1. A natural gas fuel regulator device for delivering natural gas to a fuel intake system of a natural gas fired internal combustion engine comprising:
   a) a gas metering element for receiving gas from a source and metering the flow of said gas in response to a change in pressure from said fuel intake system,
   b) a fuel regulating element for setting the flow of fuel to said fuel intake system;
   c) a pressure-modulating chamber between said gas metering element and said fuel regulating element for modulating said pressure within said regulator to dampen the amplitude of pressure changes from said fuel intake system.

2. A natural gas fuel regulator device for regulating natural gas flow to the carburetion system of a natural gas fired internal combustion engine comprising:
   a) a gas metering element having a housing defining a divided chamber having a first receiving chamber portion in communication with natural gas from a source, and a second chamber portion, and having a valve between said first receiving chamber portion and said second chamber portion for metering gas through said gas metering element in response to pressure changes in said second chamber portion;
   b) a fuel trim element having a housing defining a divided chamber having a first chamber portion and a second exiting chamber portion in communication with said carburetion system wherein said carburetion system communicates pressure changes to said second exiting chamber portion in response to change in said internal combustion engine speed and having a valve between said first chamber portion and said exit chamber portion for maintaining a flow of said gas through said fuel trim element, and
   c) a pressure-modulating element defining a pressure-modulating chamber, the inlet side of which communicates with the second chamber portion of said gas metering element and the exit side of which communicates with the first chamber portion of said fuel trim element such that the pressure-modulating chamber is effective to dampen the amplitude of pressure changes from said carburetion system.

3. The device of claim 2 wherein said valve in said fuel trim element is maintained in fixed flow position by means of a manually operated setscrew.

4. The device of claim 2 wherein said pressure-modulating chamber has a volume of from about 12 cubic inches to about 16 cubic inches and said pressure-modulating element is from about 0.75 inches to about 1.0 inch in length.

5. The device of claim 2 wherein said natural gas from a source is delivered to said first receiving chamber at a pressure of from about 1.5 to 2.0 psig.

6. The device of claim 2 wherein said internal combustion engine is turbo-charged.

7. The device of claim 2 wherein said internal combustion engine is a driver for a co-generation unit.

8. The device of claim 2 wherein said valve between said first receiving chamber portion and said second chamber portion is actuated by at least one diaphragm which deforms in response to said pressure changes in said second chamber portion.

9. The device of claim 8 wherein said at least one diaphragm comprises two diaphragms which operated in concert, one with the other, in response to said pressure changes in said second chamber portion.

10. The device of claim 2 wherein said gas metering element further comprises a shutoff mechanism which communicates with said gas metering element valve to prevent flow from said first receiving chamber portion to said second chamber portion.

11. The device of claim 10 wherein said shutoff mechanism comprises an electrically operated solenoid.

12. A method for regulating natural gas fuel flow to the carburetion system of a natural gas fired internal combustion engine comprising:

a) metering said gas from a natural gas fuel source in response to modulated pressure changes in said carburetion system;

b) modulating said pressure from said carburetion system by means of a modulating chamber to produce said modulated pressure changes.

13. The method for regulating natural gas fuel flow in accordance with claim 12 wherein said pressure-modulating chamber has a volume of from about 12 cubic inches to about 16 cubic inches and said pressure-modulating element is from about 0.75 inches to about 1.0 inch in length.

14. The method for regulating natural gas fuel flow in accordance with claim 12 wherein said natural gas fired internal combustion engine is turbo charged.

15. The method for regulating natural gas fuel flow in accordance with claim 12 further comprising maintaining a flow of said natural gas to said carburetion system by means of a trimming valve.

16. The method for regulating natural gas fuel flow in accordance with claim 15 wherein said fuel trim valve is manually operated setscrew.

17. The method for regulating natural gas fuel flow in accordance with claim 12 wherein said metering is accomplished by a valve.

18. The method for regulating natural gas fuel flow in accordance with claim 17 wherein said valve is actuated by least one diaphragm, which deforms in response to modulated pressure changes.

19. The method for regulating natural gas fuel flow in accordance with claim 17 wherein said valve can be closed to prevent natural gas fuel flow from said natural gas fuel source to said carburetion system.

20. The method for regulating natural gas fuel flow in accordance with claim 19 wherein said valve is closed by means of an electrically operated solenoid.

* * * * *